United States Patent [19]
Hochstein

[11] Patent Number: 5,280,672
[45] Date of Patent: Jan. 25, 1994

[54] APPARATUS FOR MAKING CAM SHAFTS

[76] Inventor: Peter A. Hochstein, 2966 River Valley Dr., Troy, Mich. 48098

[21] Appl. No.: 21,058

[22] Filed: Feb. 23, 1993

Related U.S. Application Data

[62] Division of Ser. No. 904,179, Jun. 25, 1992, Pat. No. 5,220,727.

[51] Int. Cl.⁵ .............................................. F16H 53/00
[52] U.S. Cl. ................................................. 29/283.5
[58] Field of Search ................... 29/888.1, 523, 283.5; 74/567; 72/56; 254/93 R, 93 H; 60/632, 633

[56] References Cited

U.S. PATENT DOCUMENTS

| | | | |
|---|---|---|---|
| Re. 32,868 | 4/1942 | Maus et al. | 29/888.1 |
| 3,661,004 | 5/1972 | Lee et al. | 72/56 |
| 3,845,667 | 11/1974 | Honrath et al. | 72/56 |
| 3,869,938 | 3/1975 | Schlotterbeck et al. | 72/56 |
| 4,037,821 | 7/1977 | Greene | 254/93 R |
| 4,693,138 | 9/1987 | Hughes et al. | 74/567 |
| 4,738,012 | 4/1988 | Hughes et al. | 29/523 |
| 4,835,832 | 6/1989 | Arnold et al. | 29/888.1 |
| 5,052,845 | 10/1991 | Maus et al. | 29/888.1 |

FOREIGN PATENT DOCUMENTS 61-135434  6/1986  Japan .................................. 29/288.1

Primary Examiner—Robert C. Watson
Attorney, Agent, or Firm—Reising, Ethington, Barnard, Perry & Milton

[57] ABSTRACT

An apparatus for making cam shafts wherein a plurality of cam lobes (12) are positioned along a hollow tubular shaft (18) and are subsequently secured thereto by expanding the shaft (18) outward, into engagement with the cam lobes (12). The shaft (18) is expanded by deflagrating a propellant (64) to generate a sudden increase of gas pressure which is introducing within the shaft (18).

20 Claims, 5 Drawing Sheets

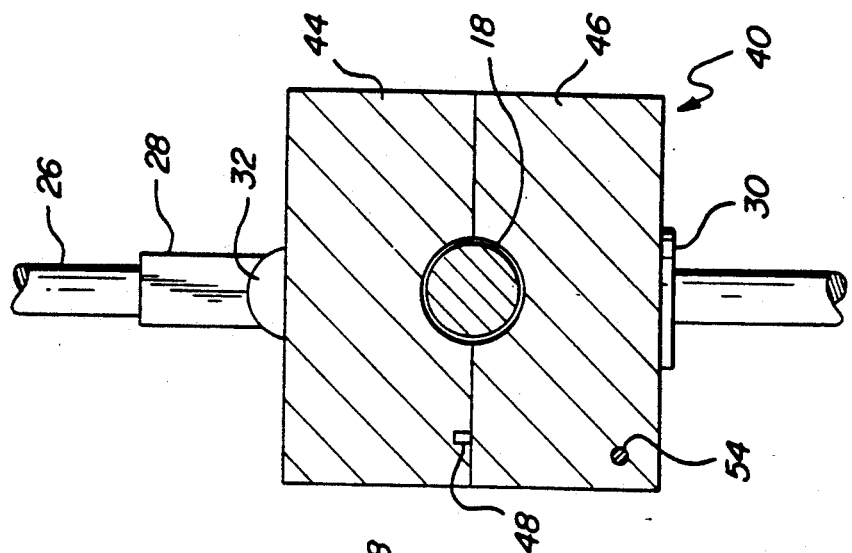
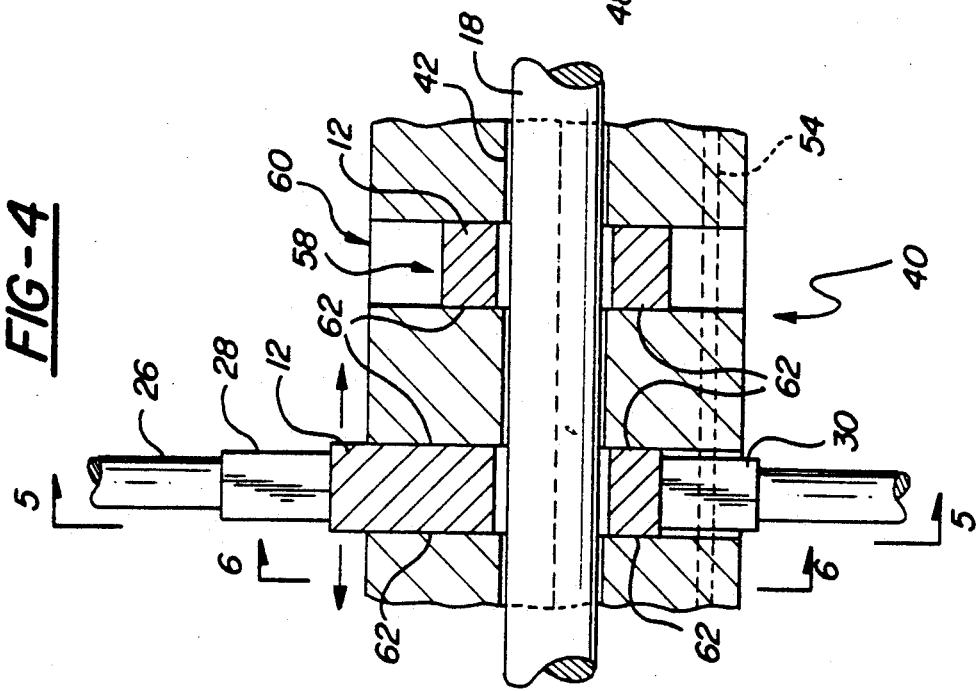
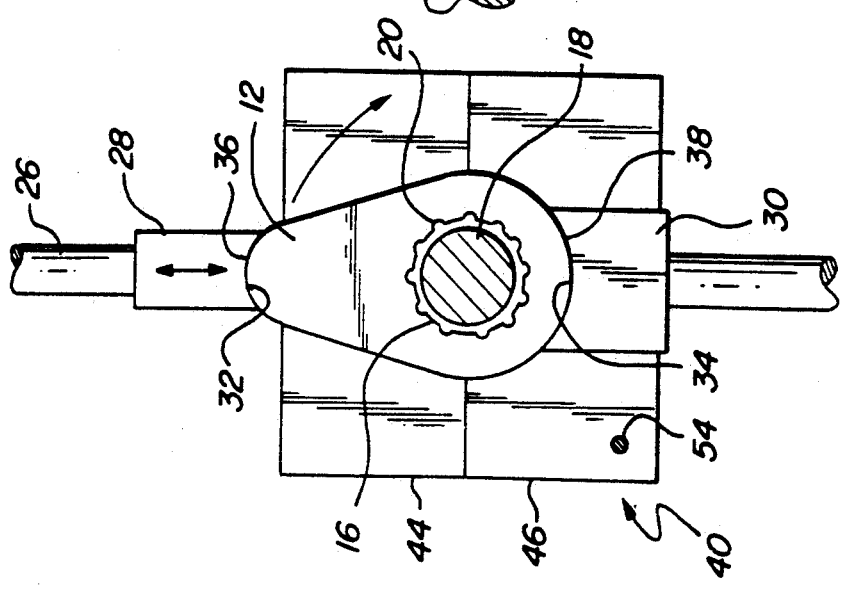

APPARATUS FOR MAKING CAM SHAFTS

This is a division of application Ser. No. 904,179, filed on Jun. 25, 1992, now U.S. Pat. No. 5,220,727.

BACKGROUND OF THE INVENTION

1. Technical Field

The subject invention relates to an apparatus for making cam shafts wherein cam lobes are disposed about and secured to a hollow tubular shaft.

2. Description of the Related Art

Cam shafts used for internal combustion engines generally consist of several cam lobes which are rigidly attached to a common shaft. These individual lobes normally activate intake or exhaust valve cam followers and, in turn, control the valves either by direct contact therewith or by way of push rods. The basic cam shaft has remained virtually unchanged in construction since the first multi-cylinder internal combustion engine of one hundred years ago.

There are several variants of traditional methods for commercially manufacturing cam shafts. Most methods involve the rough casting (in iron) of the cam shaft assembly, including the shaft, cam lobes, and bearing journals within a sand mold. Generally, the rough castings are ground in automatic machines to correctly profile the cam lobe surfaces, which not only have to be smooth and of a given curvature, but each lobe must also be in the correct disposition relative to the other cam lobes on the shaft. After the grinding operation which is slow and expensive, the cam lobes must be hardened to improve the wear resistance of the cam surfaces. Commonly, the cams are induction heat treated to insure that the proper hardness has been obtained without inducing distortions. The cams are then finished, ground and parkerized to enhance lubricant retention and to reduce the break-in interval time period. Some manufacturers pre-harden the cast blank (ungrounded lobes) to a substantial depth (0.08 to 0.09 inches) to permit uninterrupted rough and finish grinding.

Recently, all steel cam shafts have been used in some production engines because of the improved performance associated therewith. Tubular shafts permit weight savings (10%–20%) and the better metallurgical properties of the alloy steel permit improved surface hardness to be achieved with out compromise of toughness. Cast steel or billet derived cam shafts are quite expensive and show up most frequently in premium higher output engines. In an effort to obtain the advantages offered by steel cam shafts at costs more in line with cast iron cams, various manufacturers have experimented with assembled cam shafts. Assembled cam shafts generally consist of a tubular steel shaft onto which a plurality of cam lobes are secured in their proper orientations. With such assemblies, the cam lobes may be manufactured in large numbers and ground to their end product finish and curvature without being hampered by the shaft.

Manufacturing techniques which expand the tubular shaft outward to engage and retain cam lobes disposed thereabout is an attractive method for making cam shafts because all of the lobes can be fastened to the shaft at essentially one time. Generally, a holding fixture indexes all of the pre-ground cam lobe surfaces with great precision, thus making the process very repeatable. A major difficulty with such tube expanding methods, however, is the force required to expand the tube shaft.

One method that has been used to deform the shaft outward to engage the cam lobe is the "ballizing" method as shown in U.S. Pat. No. 4,575,913 to Sugiuchi. The "ballizing" method includes forcing a lubricated mandrel through the interior of the hollow shaft thereby expanding the outer diameter of the shaft and forcing the outer shaft into an interference fit within the inner diameter of an aperture disposed through each cam lobe. Circumferencial serrations located around the apertures of each cam lobe act as a spline which greatly enhances torsional stiffness by locking the lobe to the shaft. This "ballizing" technique is adaptable to commercial cam shaft manufacturing, but the extremely high friction of the mandrel against the inner shaft wall causes metal fretting and extreme wear. The life of the mandrel is therefor severely limited thus requiring uneconomical tool replacement after every few parts.

Another shaft expanding method is shown in U.S Pat. Nos. 4,738,012; 4,763,503, 4,693,138; and 5,085,099 all in the name of Hughes, which rely upon a similar cam lobe fastening topology, but accomplish the shaft expansion by hydraulic means. More specifically, the inner volume of the shaft is filled with a hydraulic fluid which acts as the working and pressure distributing fluid. A displacer piston rod is forced into the interior space of the shaft thereby increasing the internal pressure. This pressure increase will plasticly deform the steel shaft by locally yielding the wall and allowing the strained metal to mechanically lock the lobes in place.

Still another shaft expanding method is shown in U.S. Pat. No. 3,845,667 to Honrath and U.S. Pat. No. 3,869,938 to Schlotterbeck which involves the use of electromagnetic induction wherein an electronic discharge creates a shock wave to expand the shaft in localized areas. Unfortunately, such electromagnetic techniques require extremely expensive equipment. Moreover, when using shafts of substantial thickness, the expense involved in creating the necessary electronic field quickly becomes so great as to be impracticable.

English Patent No. 1,117,816 to Allsop briefly suggest that explosive forming techniques may be used to create pressure for expanding the shaft into engagement with cam lobes disposed axially therealong. However, the Allsop '816 patent discloses no specific explosive forming technique.

U.S. Pat. No. 3,869,938 to Schlotterbeck also discloses a specific explosive forming method wherein a beryllium-copper electrode is ignited within an external explosion chamber, thus releasing a shock wave which is transferred into the shaft through a water medium thereby expanding the shaft outward. Such exploding electrode techniques typically involve initiating the electrode to detonate thus creating a plasma shock wave.

Methods for expanding cam shafts by way of detonating explosives have many drawbacks. The process of detonation creates pressure shock wave wherein extremely high peak pressures are attained almost instantaneously. Consequently, the inner diameter in closes proximity to the explosive or pressure shock wave tends to crack or become extremely stressed due to the peak pressure of the shock wave. Moreover, due to the high pressure shock wave, localized areas of the shaft often become thinner as a result of material flow.

The present invention addresses the deficiencies of the current technology by retaining the convenience and cost saving features of the assembled cam lobe and shaft design, with a new means for expanding the shaft.

SUMMARY OF THE INVENTION AND ADVANTAGES

The present invention is directed toward a method for making a cam shaft from a plurality of cam lobes having apertures disposed therethrough and a hollow tubular shaft extending between opposite ends and along a longitudinal axis. The method comprising the steps of; inserting the hollow tubular shaft through the apertures of a plurality of lobes, positioning the lobes along the hollow tubular shaft, and providing a propellant. The method is characterized by deflagrating the propellant to generate a sudden increase of gas pressure and introducing the increased gas pressure into the hollow tubular shaft to expand the shaft into engagement with the lobes thereby securing the lobes to the shaft and preventing movement therebetween.

The present invention also includes an apparatus for making a cam shaft from a plurality of cam lobes having apertures disposed therethrough and a hollow tubular shaft extending between opposite ends and along a longitudinal axis. The apparatus comprises, a support means for supporting the hollow shaft and cam lobes, a propellant, and is characterized by deflagration means for deflagrating the propellant to introduce a sudden increase of gas pressure within the hollow tubular shaft to expand the shaft within the apertures of the cam lobes and into engagement with the cam lobes thereby securing the cam lobes to the shaft and preventing movement therebetween.

FIGURES IN THE DRAWINGS

Other advantages of the present invention will be readily appreciated as the same becomes better understood by reference to the following detailed description when considered in connection with the accompany drawings wherein:

FIG. 4 is a cross sectional view, partially cut away showing the locator arms positioning the cam lobes about the shaft while disposed within the holding fixture;

FIG. 5 is an end view taken along lines 5—5 of FIG. 4;

FIG. 6 is a cross sectional end view taken along lines 6—6 of FIG. 4;

DETAILED DESCRIPTION OF THE PREFERRED EMBODIMENTS

Figure 1:
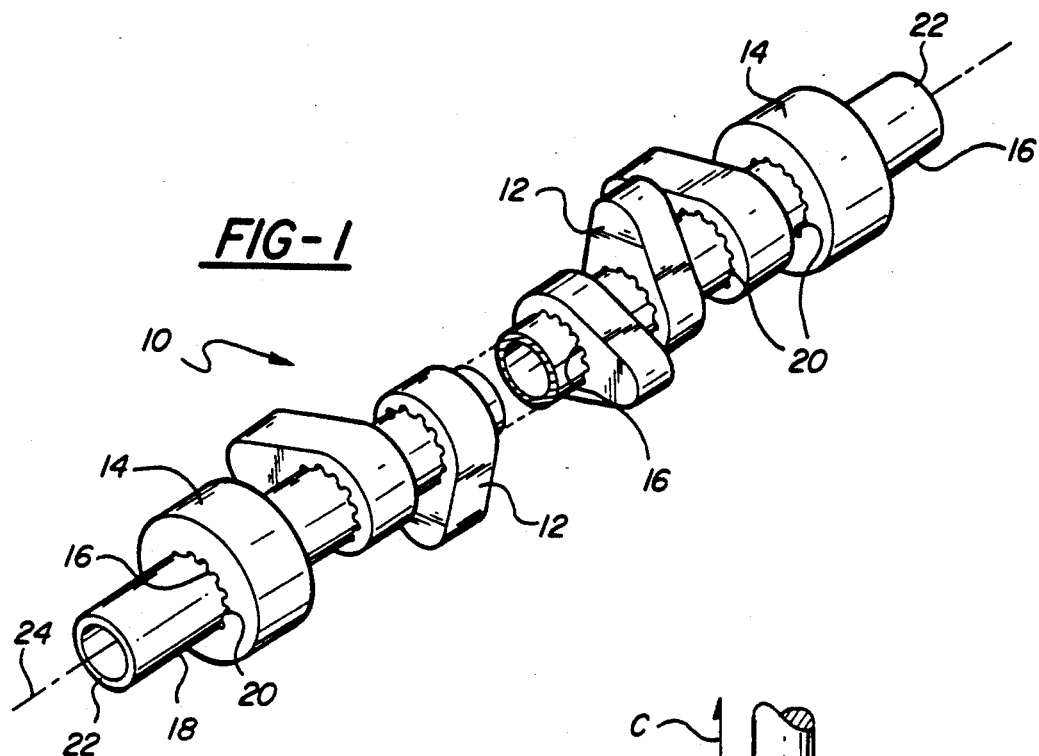
FIG. 1 is a perspective view partially cut away showing the cam shaft including individual cam lobes secured to the hollow tubular shaft.

By way of introduction, the subject invention is directed toward a method and apparatus for making cam shaft assemblies wherein a plurality of cam lobes having apertures disposed therethrough are positioned along a hollow tubular shaft. The cam lobes are secured to the shaft by expanding the shaft outward into engagement with the lobes, thereby securing the lobes to the shaft and preventing axial, radial, and angular movement therebetween. The shaft is expanded by introducing an increase in gas pressure within the shaft. The subject invention utilizes the process of deflagration for generating gas pressure. Before proceeding to a detailed description of the invention, a brief discussion of explosive technology is in order.

Explosives are substances, which when initiated, undergo a rapid chemical reaction that generates large quantities of heat and gas which exert high pressure upon their surroundings. Typically, explosives are initiated by high temperatures generated by such means as spark, electronic charge, flame, shock, impact, heating, friction, or by a sympathetic reaction from a donor explosive. Cook, M., and Thompson, G. "Chemical Explosives - Rocket Propellants." 570 (ch. 19) *Riegel's Handbook of Industrial Chemistry*. 7th ed. Kent, James A., ed. New York: Van Nostrand Reinhold Co., 1962.

Explosives are usually classified into two general groups, high (detonating) and low (deflagrating) explosives, based upon the particular chemical reaction mechanism involved. Cook, M., and Thompson, G. "Chemical Explosives - Rocket Propellants." 571 (ch. 19) *Riegel's Handbook of Industrial Chemistry*. 7th ed. Kent, James A., ed. New York: Van Nostrand Reinhold Co., 1962. An understanding of chemistry is not necessary to appreciate the distinction between these chemical reaction mechanisms due to their drastically different physical properties.

High explosives proceed by a *detonation* mechanism wherein a pressure shock wave is generated. The shock wave generally propagates at speeds between one to seven miles per second. Accordingly, the chemical reaction is initiated almost instantaneously and creates an extremely high localized peak pressure (100,000–5,000,000 p.s.i.) within a short time period ranging from a few tenths of a microsecond to several microseconds. Detonation is characterized by an extremely steep pressure-time curve which drops off very quickly. Meyer, R. *Explosives*. 3rd ed. Essen/Germany: VCR 1987: 82–91.

On the other hand, low explosives, usually called "propellants," proceed by a *deflagration* mechanism which is characterized by a much slower chemical reaction (usually hundreds of times slower than detonation reactions), generating lower localized peak pressures (generally less than 50,000 p.s.i.), over longer time periods. Instead of propagating by way of a shock wave as with detonation, deflagration reactions are propagated by thermal conduction and radiation. Cook, M., and Thompson, G. "Chemical Explosives—Rocket Propellants." 571 (ch. 19) *Riegel's Handbook of Industrial Chemistry*. 7th ed. Kent, James A., ed. New York: Van Nostrand Reinhold Co., 1962.

Detonation and deflagration are distinctly different mechanisms and there is no continuous transition therebetween. TNT is illustrative of the difference between detonation and deflagration mechanisms due to the fact that TNT is capable of proceeding by both detonating and deflagrating mechanisms. When detonated, TNT explodes in a fashion which most are accustom i.e. a violent blast or shock wave is created with high pressures and temperatures. However, under proper conditions, TNT may be deflagrated. When TNT reacts by way of a deflagrating mechanism, it burns slowly, producing flame and localized heat, very similar to a flare.

The problem with using detonating explosives to expand a cam shaft is the shock wave created by the explosion tends to crack or stress the shaft in localized areas. Moreover, due to the high peak pressure created almost instantaneously, the shaft wall in closest proximity with the explosive tends to become thinner as a result of material flow. Accordingly, with explosive techniques which generate shock waves, the explosive generally needs to be intimately bonded or distributed, uniformly about the inner diameter of the shaft. As can be appreciated, such a task is extremely difficult to achieve.

Thus, unlike the prior art explosive forming methods which utilize a detonation process, the subject method utilizes a deflagration process, thereby avoiding a pressure shock wave and all of the problems associated therewith.

Referring now to the drawings wherein like numerals indicate like or corresponding parts throughout the several views, FIG. 1 generally shows a cam shaft 10 made by the subject method and apparatus. The cam shaft 10 includes a plurality of cam lobes 12 and bearing journals 14 each having an aperture 16 disposed therethrough for receiving a hollow tubular shaft 18. The apertures are larger in diameter than the outer diameter of the shaft 18 and preferable include splines 20 disposed circumferencally thereabout. Alternatively, the apertures may be non-circular or irregularly shaped (not shown). Thus, when the shaft 18 is subsequently expanded within the apertures 16 (discussed below), the splines 20 or non-circular shape of the aperture, engage the outer diameter of the shaft 18 and prevent movement therebetween.

The hollow tubular shaft 12 extends between opposite ends 22 along a longitudinal axis 24. The cam lobes 12 preferably have an oval shaped cross section, best shown in FIG. 5, and are fabricated and prefinished to final tolerances as is commonly known in the art. Subsequently, the shaft 18 is inserted through the apertures 16 of the lobes 12 and bearing journals 14 so that the lobes 12 and journals 14 are loosely located along the shaft 18 in their proper order depending upon the particular application e.g. the number of engine valves.

The lobes 12 and bearing journals 14 are subsequently positioned with respect to the shaft 18. It is extremely important that the lobes 12 and journals 14 be properly positioned prior to securing them to the shaft or else engine valve operation will be adversely affected. The lobes 12 must be positioned with respect to three separate axes. More particularly, the lobe 12 must be axially, radially, and angularly positioned with respect to the shaft 18. The axial position refers to the specific position along the longitudinal axis 24, the angular position refers to a specific plane perpendicular to the longitudinal axis 24, and the radial position refers to the particular angle within the plane perpendicular to the longitudinal axis 24. For example, FIG. 1 shows the cam lobes 12 positioned axially, along the shaft 18. The lobes 12 are also each positioned angularly, in planes perpendicular to the axis 24 and, are positioned radially (i.e. shown 90 degrees rotated from adjacent lobes 12).

Figure 2:
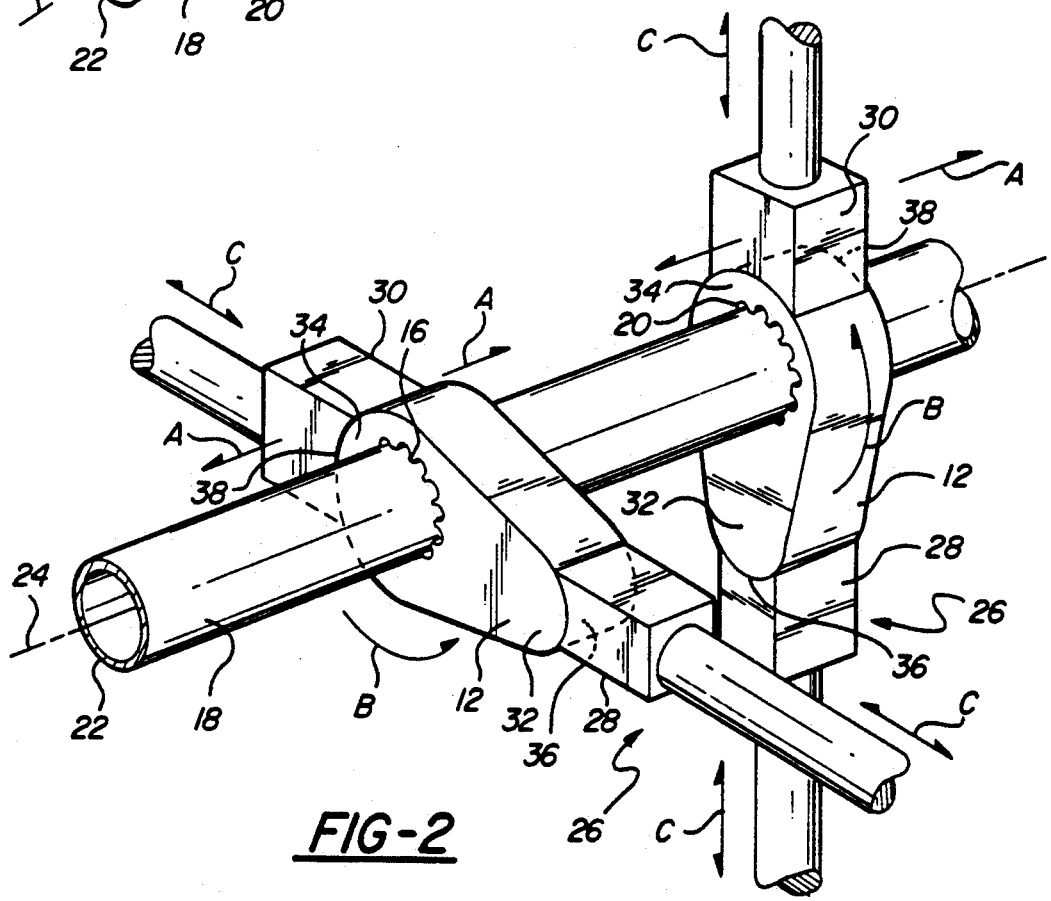
FIG. 2 is an enlarged perspective view partially cut away showing locator arms locating the cam lobes about the hollow tubular shaft.

The preferred method and apparatus for positioning the lobes 12 about the shaft 18 is shown in FIGS. 2-6. Turning to FIG. 2, two locator arms are generally shown at 26, including upper 28 and lower 30 portions for correspondingly engaging an upper 32 and lower 34 part of each cam lobe 12. The upper portion 28 of the locator arm 26 includes an engaging surface 36 which corresponds in size and shape to the upper part 32 of the lobe 12, and the lower portion 30 includes an engaging surface 38 which corresponds in size and shape to the lower portion 34 of the cam lobe 12. The upper 28 and lower 30 portions of the locator arm 26 are movable axially and radially, as shown by arrows A and B respectfully. Moreover, the upper 28 and lower 30 portions of the locator arm 26 are movable toward one another for engaging with the upper 32 and lower 34 parts of the lobe 12, as indicated by arrow C. After the upper 28 and lower 30 portions of the locator arm 26 are firmly engaged with the upper 32 and lower 34 parts of the lobe 12, the lobe 12 is radially positioned about the shaft 18. For example, in FIG. 2, the two lobes 12 shown are both positioned in planes perpendicular to the longitudinal axis 24 and at radial positions approximately 90 degrees from one another.

Figure 3:
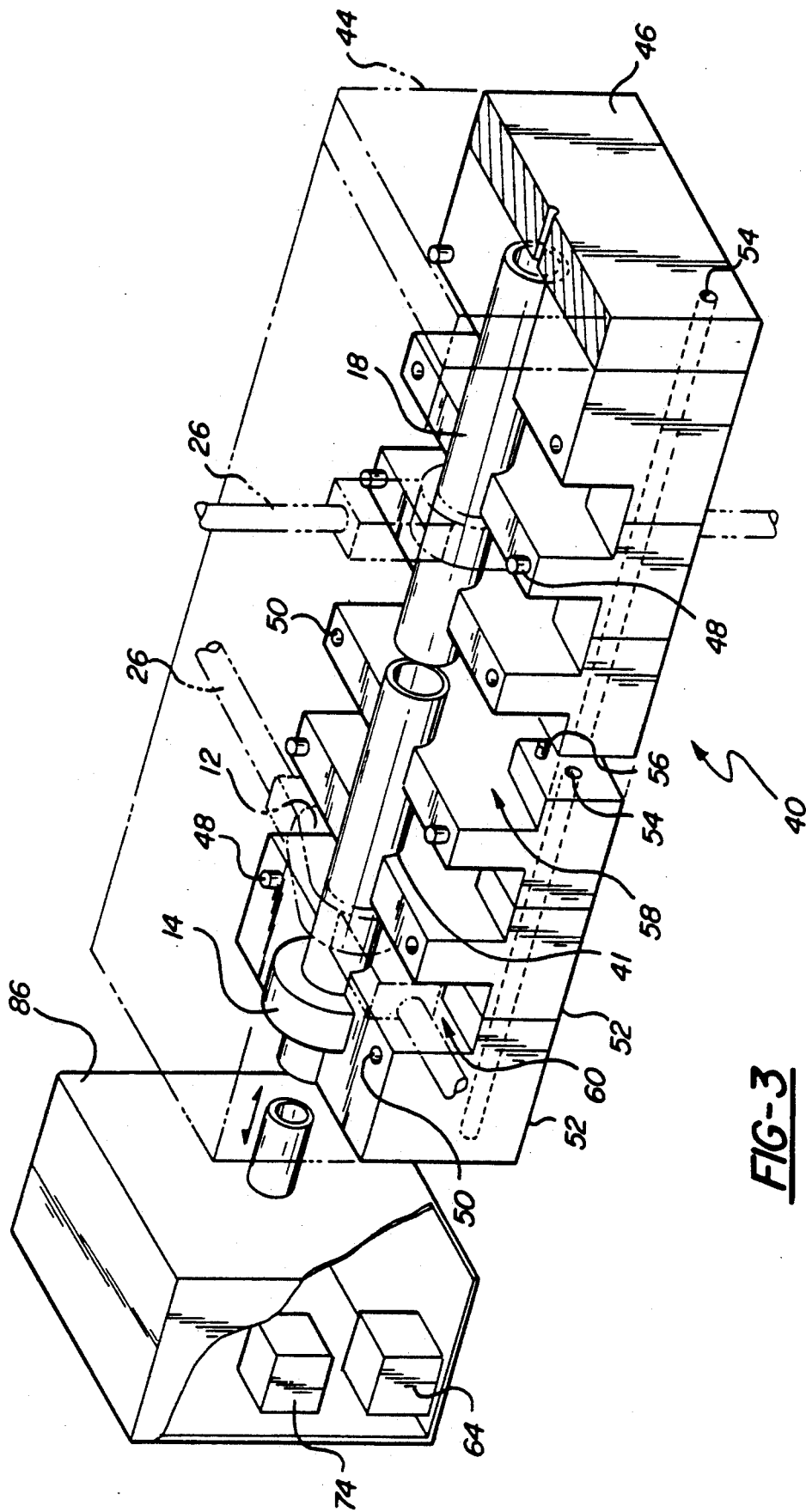
FIG. 3 is a perspective view partially cut away showing a preferred embodiment of the subject apparatus including the holding fixture and an external pressure chamber.

Turning to FIG. 3, a support means or holding fixture is generally shown at 40. The holding fixture 40 includes a shaft receiving portion 42 for supporting the shaft 18 therein and for limiting the expansion of the shaft (to be discussed in detail below). The preferred embodiment of the holding fixture 40 includes mating upper 44 and lower 46 halves. The upper 44 and lower 46 halves are substantially identical and are aligned with one another by inserting alignment pins 48 extending from one half into receiving alignment holes 50 found within the corresponding half. The halves 44,46 may be secured to one another by way of a clamp (not shown) or the alignment pins 48 and holes 50 may share a tight interference fit, thus holding the two halves together. Alternatively, the alignment pins 48 and holes 50 may be threaded (not shown) so that the pins 48 are threaded into the holes 50, thus not only aligning the upper 44 and lower 46 halves, but also securing the halves together. Each half preferably includes a plurality of individual units 52, axially aligned and interconnected by a longitudinal alignment pin 54 extending through the individual units 52. Each unit 52 may also include individual axial alignment pins 56 and holes (not shown) for axially aligning the individual units 52 with adjacent units. The units 52 comprising each half 44,46 may be secured to one another by way of a clamp (not shown) or alternatively the longitudinal alignment pin 54 or axial alignment pins 56 may maintain a tight interference fit with the corresponding holes in which they are disposed, thus securing the units 52 to one another, in alignment. Other methods and means commonly known in the art may also be used to secure the individual units 52 to one another.

The assembled units 52 form lobe pockets 58 for receiving the lobes 12 therein and include openings 60 for permitting the locating arms 26 to access the pockets 58 to engage the lobes 12. The assembled units 52 also form lobe abutting surfaces 62 which abut the opposite sides of each lobe 12, thus axially and angularly positioning the lobes 12 about the shaft 18. This is best shown in FIG. 4. Turning FIG. 4, a portion of the holding fixture 40 is generally shown in cross section, including the shaft 18 with lobes 12 positioned thereabout. The locator arm 26, including upper 28 and lower 30 portions, is shown engaged with one lobe 12. The abutting surfaces 62 abut the sides of the lobes 12, thus "sandwiching" the lobes 12 and positioning the lobes axially and angularly about the shaft 18. The shaft receiving portion 42 of the holding fixture 40 supports the shaft 18 and prevents expansion thereof. That is, when the shaft is expanded, as described below, the expansion of the shaft is limited by the inner diameter of the shaft receiving portion 42. The units 52 need not all be of the same axial thickness, thus, the axial position of the lobes 12 can be varied by utilizing units 52 of different axial thicknesses. Moreover, more or less units 52 may be used depending upon the particular application e.g. the number of engine valves.

Turning to FIG. 5, the upper 28 and lower 30 portions of the locator arm 26 are shown engaged with the upper 32 and lower 34 parts of the cam lobe 12. As is apparent from FIG. 5, the upper engaging surface 36 and lower engaging surface 38 correspond in shape to the upper 32 and lower 34 parts of the cam lobe 12. The splines 20 disposed about the circumference of the aperture 16 are also shown.

FIG. 6 shows a cross section of the holding fixture 40, including the upper 44 and lower 46 halves aligned together by way of an alignment pin 48.

Known methods and means for positioning the lobes 12 and journals 14 about the shaft 18, other than those specifically disclosed herein, may be used within the scope of the subject invention. For example, the holding fixture and positioning means shown in U.S. Pat. No. 5,085,099 to Hughes may be used for positioning the lobes 12 about the shaft 18.

After the hollow tubular shaft 18 has been inserted through the apertures 16 of the cam lobes 12 and bearing journals 14; the lobes 12 and journals 14 have been positioned about the shaft 18; and the shaft 18, lobes 12 and bearing journals 14 are supported in a holding fixture 40 as described above; a propellant is deflagrated to generate a sudden increase of gas pressure. This increase of gas pressure is introduced into the hollow tubular shaft 18 to expand the shaft 18 outward into engagement with the splines located about the apertures 16 of the lobes 12 and bearing journals 14, thereby securing the lobes 12 to the shaft 18 and preventing movement therebetween. The deflagration process is preferably an oxidizing reaction wherein the propellant is oxidized by an oxidizing agent. The preferred oxidizing agent is oxygen. However, the propellant need not be oxidized, or if oxidized, need not utilize oxygen as the oxidizing agent. For example, finely divided, chemically cleaned titanium may be deflagrated if a spark is generated in contact therewith within a nitrogen environment. Note in this example, titanium is not oxidized, and oxygen is not present.

Figure 7:
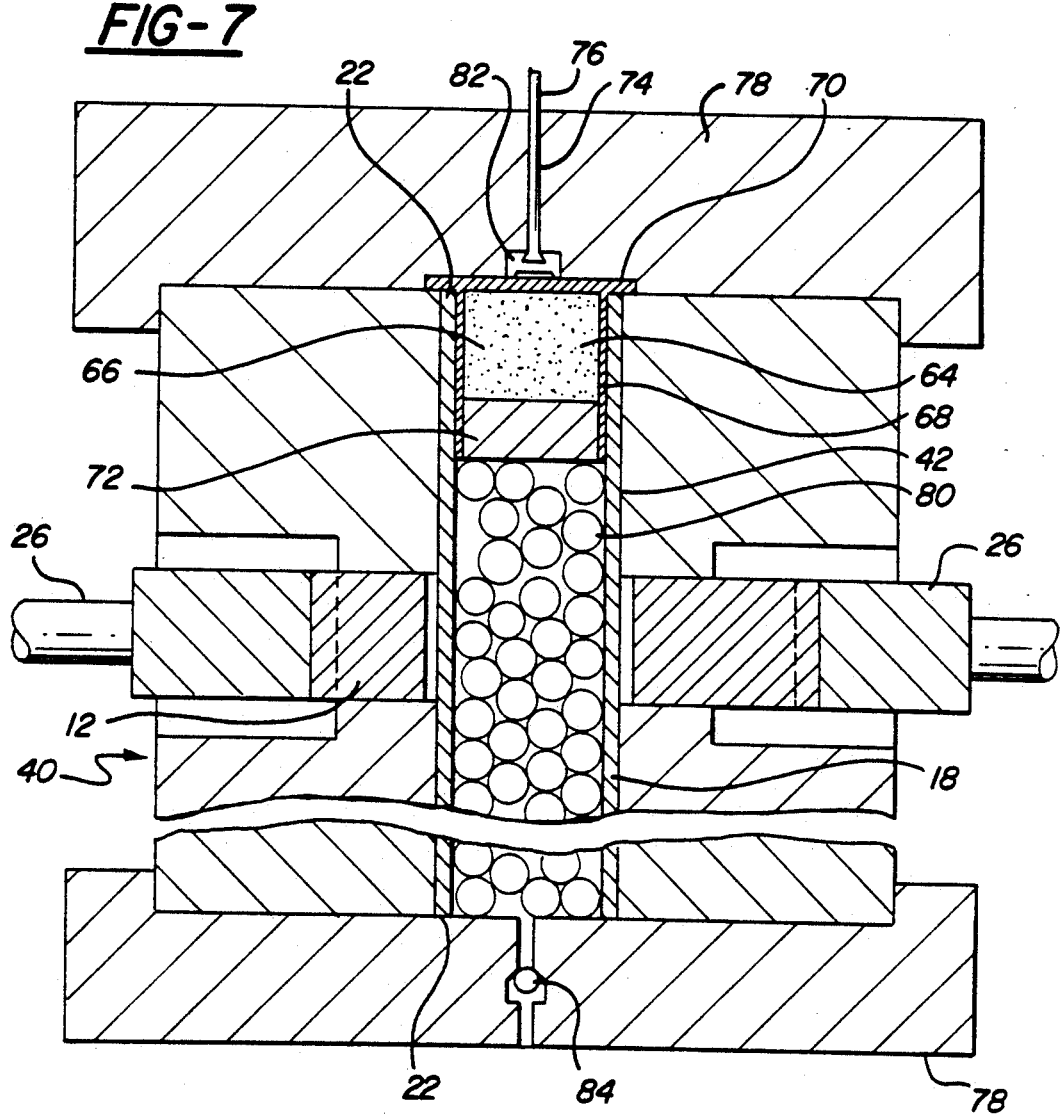
FIG. 7 is a enlarged cross sectional view, partially cut away, showing a preferred embodiment of the subject apparatus wherein the shaft is located within the holding fixture with the propellant cartridge disposed within the shaft.

A preferred embodiment of the subject invention is shown in FIG. 7. A cross section of the holding fixture is shown partially cut away, including the shaft 18 disposed within the fixture 40, and a locator arm 26 holding a lobe 12 in proper positioned about the shaft 18. A propellant 64 is provided. Deflagration means is also provided for deflagrating the propellant 64 to generate gas pressure to expand the shaft 18 outward into engagement with the cam lobes 12. The deflagration means includes an oxidizing agent 66, preferably oxygen molecularly bonded with the propellant 64. Examples of suitable propellants include but are not limited to; colloidal nitrocellulose (cellulose nitrate with 12.6% nitrogen), double base powders (60-80% nitrocellulose, 20-40% nitroglycerin), cordite, flashless non-hydroscopic powders, Albanite (Di(2-nitrooxyethyl)nitramine), and black powder. The propellant 64 is disposed within a vessel preferably a cartridge 68, similar to a common shot gun shell casing or .22 caliber bullet casing. The cartridge 68 is disposed within the shaft 18, adjacent one end 22 as shown in FIG. 7. The cartridge 68 includes a case head 70 and may also include a wadding 72 disposed within the cartridge 68, as is common with shot gun shells.

The deflagration means further includes initiating means 74 for initiating the propellant 64 to deflagrate. The preferred initiation means 74 is a percussion member 76 for striking the case head 70 to initiate the propellant 64 to deflagrate. However, it will be appreciated that other initiation means commonly used for initiating propellants may be used, including spark, shock, electrical charge, and heat generating means (not shown).

The ends 22 of the shaft 18 are preferable sealed with a sealing means such as end caps 78. With the embodiment shown in FIG. 7, only one end cap 78 may be necessary, although two are shown. That is, depending upon the thickness of the shaft, inner volume of the shaft 18, and the amount and type of propellant 64 used, a single end cap 78 located adjacent the cartridge 68 may be sufficient. If however, end caps 78 are used on both ends 22 of the shaft 18, volume reducing means 80 may be disposed within the shaft 18 to reduce the amount of free volume within the shaft, thus reducing the amount of pressure necessary to expand the shaft 18. The volume reducing means 80 may comprise any substantially non-compressible, inert material e.g. iron ball bearings The end cap 78 adjacent the cartridge 68 may include an aperture 82 therein for positioning the initiation means 74 therethrough. The end cap 78 opposite the cartridge 68 may include a pressure release valve 84 for releasing pressure from within the shaft 18 if pressure in excess of a predetermined valve is generated within the shaft 18.

The preferred method for making the cam shaft using the apparatus shown in FIG. 7, includes the steps of positioning the lobes 12 and journal bearings 14 along the shaft 18 as previously described. The method further includes disposing the propellant 64 within the shaft 18, preferably within a cartridge 68. This may be accomplished by packing a common shot gun shell casings with the propellant 64 and wadding 72. Alternatively, a commercially available .22 caliber shell may be used as is common in connection with industrial hammers and similar equipment. It will be appreciated by those skilled in the art that many other means of disposing the propellant within the shaft may be utilized. Also, shells including projectiles therein e.g. shot or bullets, may be used in connection with the subject method. However, if such shells are used, the volume reducing means 80 cannot be used and the end cap 78 opposite the cartridge 68 should also not be used. The outer diameter of the projectile should be less than the inner diameter of the shaft 18.

The cartridge 68 is subsequently positioned within the shaft 18 and at least one end 22 of the shaft 18 is sealed with an end cap 78. The propellant is initiated to deflagrate by striking the percussion member 76 which, in turn, strikes the case head 70 of the cartridge 68 and initiates the propellant 64 to deflagrate within the shaft 18, thereby generating a sudden increase in gas pressure which expands the shaft outward into engagement with the cam lobes 12 and journal bearings 14 positioned therealong. The shaft receiving portion 42 disposed within the holding fixture 40 not only supports the shaft 18 but also limits the expansion of the shaft 18.

Figure 8:
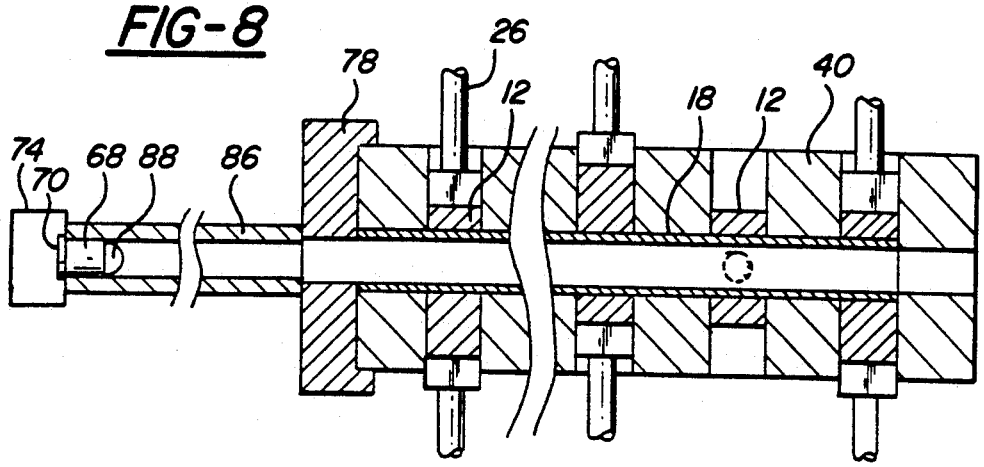
FIG. 8 is a reduced cross sectional view, partially cut away showing yet another embodiment of the subject apparatus including an external pressure chamber.

FIG. 8 discloses an embodiment of the invention similar to that shown in FIG. 7 with the primary distinction being the use of an external pressure chamber 86 in fluid communication with the interior of the hollow shaft 18. More particularly, a cartridge 68 similar to that previously described with reference to FIG. 7, is positioned in an external pressure chamber 86, shown in a gun barrel-type configuration. The propellant 64 in the cartridge 68 is initiated in a similar manner as previously described i.e. struck with a percussion member 76 so that the propellant 64 is initiated within the external pressure chamber 86 and the sudden increase in gas pressure created thereby is introduced into the hollow shaft 18. Alternatively, the propellant 64 may be initiated by other common means including spark, shock, etc. The cartridge 68 is shown including a projectile i.e. bullet 88. The bullet 88 is projected through the external pressure chamber 86 when the propellant 64 is initiated and subsequently travels through the hollow shaft 18, exiting the opposite end of the shaft 18 where it is preferably received by a damping means (not shown). When using ammunition which includes a projectile, it is important that the projectile have no greater outer diameter than the inner diameter of the hollow shaft.

Figure 9:
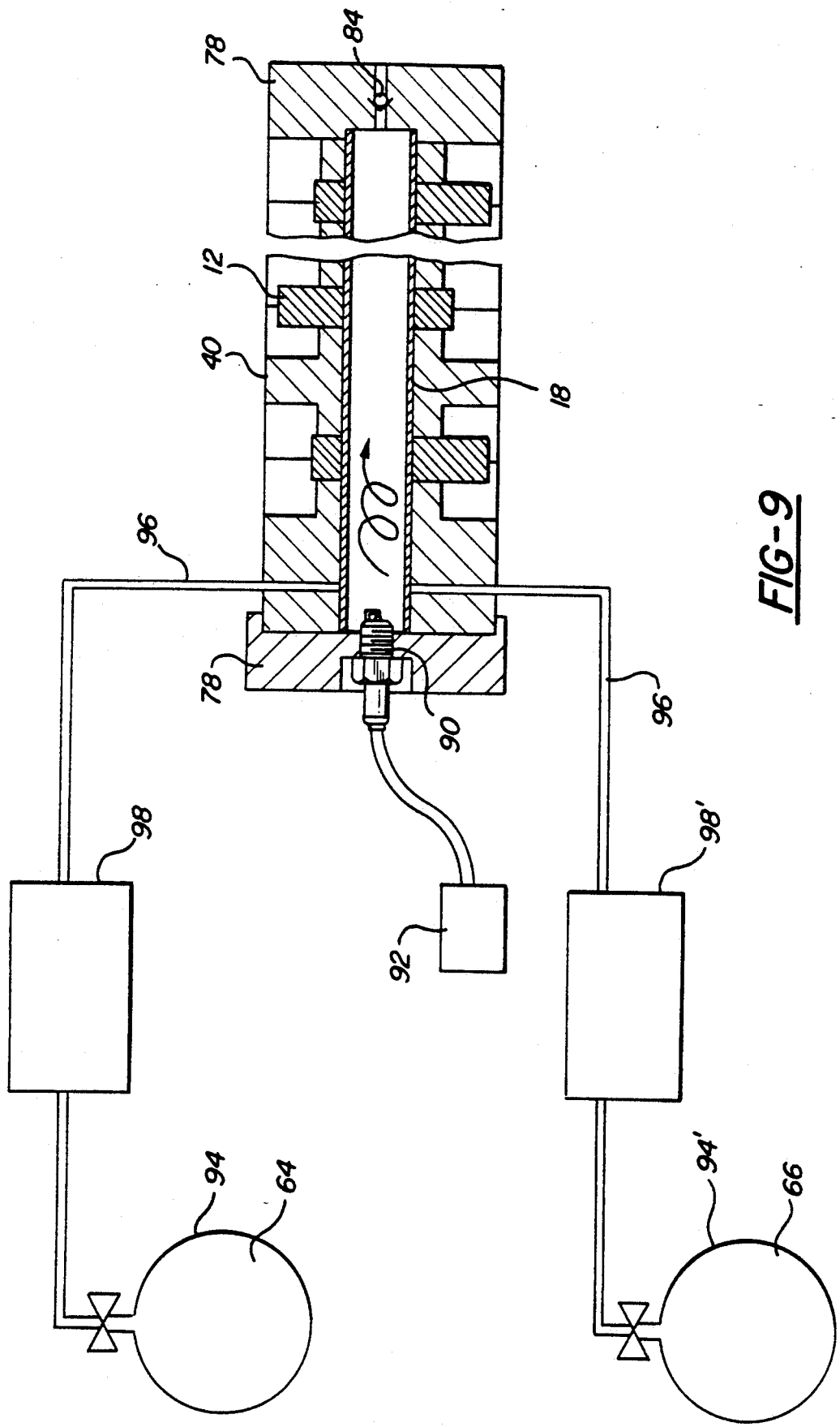
FIG. 9 is a cross sectional view, partially cut away showing still another preferred embodiment of the subject apparatus including fluid holding tanks and metering pumps shown schematically.

FIG. 9 shows yet another preferred embodiment of the subject invention. The apparatus shown is substantially similar to those previously described. That is, the identical holding fixture 40 is shown including a shaft 18 with lobes 12 positioned therealong supported within the fixture 40. The apparatus, however, includes a different initiation means 74 than previously shown. More particularly, a spark generating means is provided preferable including a spark plug 90 disposed through an end cap 78 of the assembly. The spark plug 90 is interconnected with a power source 92 for generating spark when desired. The end cap 78 located on the opposite end 22 of the shaft 18, (opposite the spark plug 90), preferably includes a pressure relief valve 84. The assembly also includes holding tanks 94, 94' for holding fluid propellant 64 and oxidizing agent 66. The holding tanks 94,94' are in fluid communication with the inner portion of the shaft 18 by way of fluid lines 96. Metering pumps 98,98' are included for controlling fluid flow from the tanks 94,94' to the inner portion of the shaft 18. The preferred propellant 64 is acetylene, however, other combustible gases may also be used such as butane, propane, etc. The oxidizing agent 66 is preferable atmospheric oxygen. The term atmospheric oxygen is intended to means oxygen gas. The oxygen gas and propellant 64 are generally stored under pressure within the holding tanks 94, 94'.

The preferred method for practicing the invention as shown in FIG. 9 includes the steps of positioning the lobes 12 and journal bearings 14 along the shaft 18 as previously described. The method further includes sealing the ends 22 of the shaft 18 with end caps 78 and subsequently disposing the propellant 64 within the shaft 18. The propellant 64, preferably acetylene gas, is transferred from the holding tank 94 to the inner portion of the shaft 18 by way of the metering pump 98, in turn, located in line. In a similar fashion, the oxidizing agent 66, preferably atmospheric oxygen, is transferred from another holding tank 94' to the inner portion of the shaft 18 by way of a separate metering pump 98', where it mixes with the propellant. The propellant is initiated by way of the spark plug 90 which generates a spark inside the shaft 18, thus igniting the propellant 64. As the propellant 64 burns, a sudden increase of gas pressure is generated within the shaft 18, thus expanding the shaft outward into engagement with the lobes 12 and bearing journals 14 disposed along the shaft 18.

FIG. 3 shows a conceptual preferred embodiment of the invention including an external pressure chamber 86 in fluid communication with the interior of the shaft 18 and including a propellant 64 and initiation means 74 disposed therein. The specific propellant used may include any of those discussed herein or commonly known. The specific initiation means may be one disclosed herein or commonly known for initiating the particular propellant used. The propellant is initiated within the external pressure chamber to deflagrate and suddenly generate increased gas pressure. The increased gas pressure is subsequently introducing into the hollow tubular shaft to expand the shaft outward into engagement with the lobes 12.

The invention has been described in an illustrative manner and it is to be understood that the terminology which has been used is intended to be in the nature of description rather than limitation. Obviously many modifications and variations of the present invention are possible in light of the above teachings. It is, therefore to be understood that within the scope of the appended claims, the invention may be practiced otherwise than as specifically described. Reference numerals have been included in the claims to facilitate an understanding of the claimed invention and are not intended to be limiting in any way.

What is claimed:

1. An apparatus for making a cam shaft from a plurality of cam lobes having apertures disposed therethrough and a hollow tubular shaft extending between opposite ends and along a longitudinal axis, said apparatus comprising:
   support means for supporting the hollow shaft and cam lobes;
   a propellant; and characterized by,
   propellant to introduce a sudden increase of gas pressure within the hollow tubular shaft to expand the shaft within the apertures of the cam lobes and into engagement with the cam lobes thereby securing the cam lobes to the shaft and preventing movement therebetween, said deflagrating means including an oxidizing agent for oxidizing said propellant.

2. An apparatus as set forth in claim 1 further characterized by said oxidizing agent including oxygen.

3. An apparatus as set forth in claim 2 further characterized by including atmospheric oxygen.

4. An apparatus as set forth in claim 2 further characterized by said oxygen molecularly bonded with said propellant.

5. An apparatus as set forth in claim 1 further characterized by said deflagration means including initiating means for initiating said propellant to deflagrate.

6. An apparatus as set forth in claim 5 further characterized by an external pressure chamber in fluid communication with the interior of the shaft, said propellant disposed within said external pressure chamber, said initiating means engagable with said propellant for initiating said propellant to deflagrate within said external pressure chamber.

7. An apparatus as set forth in claim 5 further characterized by said propellant disposed within the shaft, said initiating means engagable with said propellant for initiating said propellant to deflagrate within the hollow shaft.

8. An apparatus as set forth in claim 5 further characterized by said propellant disposed within a cartridge.

9. An apparatus as set forth in claim 8 further characterized by said initiation means comprising a percussion member for striking said cartridge to initiate said propellant to deflagrate.

10. An apparatus as set forth in claim 9 further characterized by said cartridge located within the shaft.

11. An apparatus as set forth in claim 8 further characterized by said cartridge including a projectile having an outer diameter no greater than the inner diameter of the hollow shaft for being forced from said cartridge and through the hollow shaft when said propellant is initiated.

12. An apparatus as set forth in claim 8 further characterized by said deflagrating means including an oxidizing agent for oxidizing said propellant wherein said oxidizing agent includes oxygen molecularly bonded with said propellant.

13. An apparatus as set forth in claim 5 further characterized by said propellant comprising a fluid.

14. An apparatus as set forth in claim 5 further characterized by said deflagrating means including atmospheric oxygen and said propellant including acetylene.

15. An apparatus as set forth in claim 13 further characterized by said deflagrating means including an oxidizing agent for oxidizing said propellant.

16. An apparatus as set forth in claim 15 further characterized by holding tanks for holding said propellant and oxidizing agent.

17. An apparatus as set forth in claim 6 further characterized by metering pumps for controlling the flow of said propellant and oxidizing agent from said holding tanks.

18. An apparatus as set forth in claim 17 further characterized by said initiation means comprising a spark generator means.

19. An apparatus as set forth in claim 18 further characterized by sealing means for sealing at least one of the ends of the hollow shaft.

20. An apparatus as set forth in claim 19 further characterized by said sealing means including a fluid passageway and check valve for venting excessive fluid pressure from within the hollow tubular shaft.

* * * * *

UNITED STATES PATENT AND TRADEMARK OFFICE
CERTIFICATE OF CORRECTION

PATENT NO. : 5,280,672
DATED : January 25, 1994
INVENTOR(S) : Peter A. Hochstein It is certified that error appears in the above-identified patent and that said Letters Patent is hereby corrected as shown below:

Claim 10, column 10, line 47
before "propellant" insert --deflagration means for deflagrating--.

Signed and Sealed this

Tenth Day of January, 1995

Attest:

BRUCE LEHMAN

Attesting Officer

Commissioner of Patents and Trademarks